United States Patent
Durrani et al.

(10) Patent No.: US 12,319,127 B2
(45) Date of Patent: Jun. 3, 2025

(54) HEAT PUMP ARRANGEMENT WITH INDIRECT BATTERY HEATING FOR BATTERY-OPERATED MOTOR VEHICLES AND METHOD OF OPERATING A HEAT PUMP ARRANGEMENT

(71) Applicant: Hanon Systems, Daejeon (KR)

(72) Inventors: Navid Durrani, Kerpen (DE); Tobias Haas, Cologne (DE); Charles Wainwright, Chelmsford (GB)

(73) Assignee: HANON SYSTEMS, Daejeon (KR)

( * ) Notice: Subject to any disclaimer, the term of this patent is extended or adjusted under 35 U.S.C. 154(b) by 327 days.

(21) Appl. No.: 18/003,382

(22) PCT Filed: Jul. 1, 2021

(86) PCT No.: PCT/KR2021/008321
§ 371 (c)(1),
(2) Date: Dec. 27, 2022

(87) PCT Pub. No.: WO2022/005217
PCT Pub. Date: Jan. 6, 2022

(65) Prior Publication Data
US 2023/0322048 A1    Oct. 12, 2023

(30) Foreign Application Priority Data
Jul. 2, 2020  (DE) .................. 10 2020 117 471.3

(51) Int. Cl.
*B60H 1/32*  (2006.01)
*B60H 1/00*  (2006.01)

(52) U.S. Cl.
CPC ....... *B60H 1/3205* (2013.01); *B60H 1/00278* (2013.01)

(58) Field of Classification Search
CPC .............. B60H 1/3205; B60H 1/32284; B60H 1/00921; B60K 11/02
See application file for complete search history.

(56) References Cited

U.S. PATENT DOCUMENTS

| 10,611,210 B2 | 4/2020 | Schedel et al. |
| 2017/0361677 A1 | 12/2017 | Kim et al. |

(Continued)

FOREIGN PATENT DOCUMENTS

| CN | 110774863 A | * | 2/2020 | ......... B60H 1/00278 |
| JP | 2020055344 A | | 4/2020 | |
| KR | 20200038032 A | | 4/2020 | |

*Primary Examiner* — Jerry-Daryl Fletcher
*Assistant Examiner* — Keith Stanley Myers
(74) *Attorney, Agent, or Firm* — Shumaker, Loop & Kendrick, LLP; James D. Miller

(57) ABSTRACT

A heat pump arrangement and a method of operating a heat pump arrangement. The heat pump arrangement has a refrigerant circuit and a coolant circuit, wherein the coolant circuit is configured for indirect battery heating. The refrigerant circuit includes a compressor, a heating condenser, a 3/2-way expansion valve, an external heat exchanger, at least one evaporator with an associated expansion element as well as a 3/2-way expansion valve arranged in parallel to the evaporator, and a battery chiller. The coolant circuit includes a coolant cooler and a battery heat exchanger with an associated coolant pump and at least one drive train cooler with an associated coolant pump arranged in parallel to the battery heat exchanger.

20 Claims, 6 Drawing Sheets

(56) References Cited

U.S. PATENT DOCUMENTS

2019/0135075 A1    5/2019  Hwang et al.
2020/0220236 A1*  7/2020  Durrani ............... H01M 10/667
2020/0247212 A1*  8/2020  Bara ........................ B60H 1/10

* cited by examiner

HEAT PUMP ARRANGEMENT WITH INDIRECT BATTERY HEATING FOR BATTERY-OPERATED MOTOR VEHICLES AND METHOD OF OPERATING A HEAT PUMP ARRANGEMENT

CROSS REFERENCE TO RELATED PATENT APPLICATIONS

This is a U.S. national phase patent application of PCT/KR2021/008321 filed Jul. 1, 2021 which claims the benefit of and priority to German Pat. Appl. No. 10 2020 117 471.3 filed on Jul. 2, 2020, the entire contents of each of which are incorporated herein by reference.

TECHNICAL FIELD

The invention relates to a heat pump arrangement with indirect battery heating for battery-operated motor vehicles.

The invention also relates to a method of operating a heat pump arrangement in selected operating modes.

The field of application of the invention is in the field of electrically powered vehicles which, as a rule, use high-voltage batteries (HV batteries) as energy storage devices for supplying energy to the vehicle's drive train.

BACKGROUND ART

An efficient heat supply for the vehicle in combination with an optimal heat management of the battery and the electric drive train plays an important role.

Electric, battery-operated vehicles generate relatively little waste heat, and there is therefore a regular need in such vehicles to generate heat efficiently for heating the vehicle cabin and to make it available in sufficient quantity and at an appropriate temperature level.

In the prior art, refrigerant circuits for refrigeration system and heat pump circuits are known for this constellation, which are specially tailored to battery-operated vehicles.

However, these systems are often very complex and only rarely able to combine the needs and requirements of the vehicle occupants for an adequate heat supply via the vehicle's air conditioning system with the cooling or heating of the battery and the electric drive train that is optimally required in the various operating states.

SUMMARY

The object of the invention is to provide a heat pump arrangement for battery-operated vehicles, which combines an increased efficiency of the heat pump for supplying the air conditioning system with heat for the passenger compartment of the motor vehicle with the possibility of an optimal heat supply for the battery, which, in addition to efficient cooling, also includes heating that is required in certain operating states.

The object is achieved by a heat pump arrangement and methods with the features as shown and described herein.

The object of the invention is achieved by a heat pump arrangement with indirect battery heating for battery-operated motor vehicles by means of a circuit arrangement characterized below.

The heat pump arrangement has a refrigerant circuit with a compressor, a heating condenser, a 3/2-way expansion valve, an external heat exchanger, at least one evaporator with an associated expansion element as well as a second 3/2-way expansion valve arranged in parallel to the evaporator, and a battery chiller. In this case, a bypass with an expansion element and a drive train chiller branches off between the heating condenser and the 3/2-way expansion valve.

Furthermore, the heat pump arrangement has a refrigerant circuit with a coolant cooler and a battery heat exchanger with an associated coolant pump as well as at least one drive train cooler with an associated coolant pump which drive train cooler is arranged in parallel to the battery heat exchanger. In this case, on the coolant side, a battery temperature control loop with the battery heat exchanger, the coolant pump, a 3/2-way valve and a battery chiller as well as an electric drive cooling loop with the drive train cooler, the coolant pump, a 3/2-way valve and the drive train chiller are formed in such a way that the battery temperature control loop and the electric drive cooling loop can be operated independently of one another and independently of the coolant circuit, as separate circuits. Furthermore, the heat pump arrangement has a heating circuit formed from the heating condenser, a coolant pump, a heating device as well as a thermal heat exchanger and which has an indirect battery heating loop. The indirect battery heating loop can be connected to the heating circuit via a 3/2-way valve and has an indirect heat exchanger which transfers heat from the battery heating loop into a refrigerant circuit or a heat carrier circuit, which is referred to as a secondary bypass circuit and formed as part of the coolant circuit with the battery heat exchanger, the coolant pump, the 3/2-way valve and the heat exchanger. The indirect heat exchanger couples the battery heating loop of the heating circuit with the secondary bypass circuit so that heat of the heating condenser can be transferred from the refrigerant circuit via the heating circuit and the indirect battery heating loop in the indirect heat exchanger to the secondary bypass circuit and finally to the battery heat exchanger. Alternatively or in addition, heat from the heating device can be transferred to the secondary bypass circuit and finally to the battery heat exchanger via the heating circuit and the indirect battery heating loop in the indirect heat exchanger.

The 3/2-way expansion valves are particularly advantageously formed with an expansion function and a bypass function.

Furthermore, advantageously, a heating condenser bypass is arranged in the refrigerant circuit as a connection of the high pressure outlet of the compressor with the 3/2-way expansion valve. The refrigerant can be directed from the compressor past the heating condenser to the external heat exchanger via the heating condenser bypass.

A refrigerant collector is preferably arranged upstream of the compressor in the re-frigerant circuit, wherein the position information relate to the direction of flow of the fluid in question.

A battery electronics cooler is advantageously arranged in the secondary bypass circuit in order to optimally control the temperature of the control and regulation components of the battery in addition to the battery itself and thus to cool or, if necessary, to heat them.

The external heat exchanger and the coolant cooler are preferably combined in a cooler unit, wherein the external heat exchanger is arranged downstream of the coolant cooler in the direction of flow of the ambient air.

Furthermore, a bypass is advantageously arranged in parallel to the battery chiller in the refrigerant circuit.

The object of the invention is further achieved by a method of operating a heat pump arrangement for actively cooling the vehicle cabin in that the refrigerant downstream of the compressor flows to the external heat exchanger operating as a condenser via the heating condenser bypass and the 3/2-way expansion valve and subsequently expands in the expansion element and is evaporated in the evaporator. The battery heat exchanger has coolant flowing through it and, at the same time, the battery temperature control loop and the secondary bypass circuit are operated in parallel. The coolant circuit is further operated with the coolant cooler and the drive train cooler for passively cooling the drive train.

Advantageously, a method of operating the heat pump arrangement for actively cooling the vehicle battery is formed in that the refrigerant downstream of the compressor flows to the external heat exchanger operating as a condenser via the heating condenser bypass and the first 3/2-way expansion valve and subsequently expands in the second 3/2-way expansion valve and evaporates in the battery chiller. The battery temperature control loop with the battery chiller, the battery heat exchanger and in parallel to the battery electronics cooler are connected in the secondary bypass. The coolant circuit is operated with the coolant cooler and the drive train cooler for passively cooling the drive train.

The operation of the refrigerant circuit to provide cold in the evaporators is referred to as active cooling. In addition to the evaporators of the air conditioning system, the battery chiller and the drive train chiller also function as evaporators in the refrigerant circuit.

Advantageously, the refrigerant circuit with the coolant cooler and the battery heat exchanger as well as in parallel therewith the drive train cooler are operated for passively cooling the vehicle battery, wherein the secondary bypass circuit is operated in parallel with the battery electronics cooler.

The coolant circuit is preferably operated with the coolant cooler and the drive train cooler for passively cooling the drive train, wherein the battery temperature control loop with the battery heat exchanger and the secondary bypass circuit with the battery electronics cooler are operated mutually parallel and independently of the coolant circuit.

According to a configuration of the method for the reheating mode of the vehicle cabin, downstream of the compressor the refrigerant is routed to the external heat exchanger operating as a condenser or an evaporator via the heating condenser and the 3/2-way expansion valve and subsequently expanded in the expansion element and evaporated in the evaporator. The battery temperature control loop and the secondary bypass are operated in parallel. The electric drive cooling loop with the drive train cooler as well as the heating circuit with the heating condenser are also operated in this mode.

The reheating mode of a vehicle air conditioning system is understood to mean air treatment wherein the air is first cooled and dehumidified and then heated to the desired temperature. Thus, both cooling the air and heating the air are required in the air conditioning system.

In the method for the reheating mode of the vehicle cabin, a heating device is preferably also operated in the heating circuit.

In the reheating mode of the vehicle cabin, a partial flow of the refrigerant downstream of the heating condenser is preferably routed via the bypass and expanded in the expansion element and evaporated in the drive train chiller in order to absorb additional waste heat of the drive train components.

Again for reheating the vehicle cabin, the intermediate pressure level in the external heat exchanger is preferably set in such a way that the temperature of the refrigerant in the external heat exchanger corresponds to the temperature of the ambient air.

For heating the vehicle cabin with waste heat of the drive train, the refrigerant downstream of the compressor is preferably directed via the heating condenser and the bypass and subsequently expanded in the expansion element and evaporated in the drive train chiller. The battery heat exchanger has coolant flowing through it and the battery temperature control loop and the secondary bypass are operated in parallel. The electric drive cooling loop with the drive train cooler as well as the heating circuit with the heating condenser and the thermal heat exchanger are operated the same way.

For heating the cabin with ambient heat, the refrigerant downstream of the compressor is directed to the 3/2-way expansion valve via the heating condenser and expanded and evaporated in the external heat exchanger. The battery heat exchanger has coolant flowing through it and, at the same time, the battery temperature control loop and the secondary bypass are operated in parallel. The electric drive cooling loop with the drive train cooler as well as the heating circuit with the heating condenser and the thermal heat exchanger are operated the same way.

For indirectly heating the battery, the heating circuit is heated with the heating device to the desired temperature and the heat carrier of the heating circuit is routed to the indirect heat exchanger via the 3/2-way valve and the indirect battery heating loop. The heating condenser and the thermal heat exchanger are inoperative in this case. The secondary bypass circuit absorbs heat in the indirect heat exchanger and gives it off to the battery heat exchanger. The electric drive cooling loop is operated separately with the drive train cooler.

For indirectly heating the battery with waste heat of the drive train, the refrigerant downstream of the compressor flows through the heating condenser and the bypass. The refrigerant then reaches the expansion element, is expanded and finally evaporated in the drive train chiller. The electric drive cooling loop is operated correspondingly, wherein the waste heat is used in the drive train chiller for evaporation of the refrigerant. The heating circuit and the indirect battery heating loop are operated and transport the heat of condensation to the battery heat exchanger via the indirect heat exchanger. In this mode the heating device in the heating circuit is not operated.

For indirectly heating the battery with ambient heat, the refrigerant downstream of the compressor is directed to the 3/2-way expansion valve via the heating condenser, and, at the same time, it is expanded and evaporated in the external heat exchanger. The refrigerant then flows to the battery chiller to the compressor via the 3/2-way expansion valve in the bypass, wherein the heating device is not operated. The heating circuit and the indirect battery heating loop are operated and transport the heat of condensation from the heating condenser to the battery heat exchanger via the indirect heat exchanger.

Indirect heating of the battery is understood to mean that heat or waste heat for heating the battery from various sources and coolant or heat carrier or refrigerant circuits is indirectly transferred to the battery one or more times via one or more heat exchangers.

In the context of the invention, a thermal heat exchanger is understood to mean a heat exchanger which, within the air conditioning system of the motor vehicle, gives off heat to the air flow of the air conditioning system for heating the vehicle cabin. A heating condenser thermally couples a refrigerant circuit and a coolant circuit as a heat exchanger. Within the refrigerant circuit, the heating condenser fulfills the function of the condenser, and the heat of condensation is given off to the coolant circuit. According to its function, the coolant circuit is referred to as a heating circuit. A heat exchanger is provided as the external heat exchanger, which absorbs heat from the ambient air in the heat pump mode of the arrangement as a radiator or gives off heat to the ambient air in the refrigeration system mode.

A battery chiller is a heat exchanger that is integrated into the refrigerant circuit on one side and into the coolant circuit on the other, wherein the battery chiller supplies the battery heat exchanger with cold on the coolant side and gives off heat on the refrigerant side.

The refrigerant collector is also referred to as an accumulator and can optionally also be embodied and operated as a separator for liquid refrigerant upstream of the compressor.

A bypass is understood to mean a refrigerant conduit which bypasses a component of the refrigerant circuit or directs part of the refrigerant mass flow in parallel to the relevant component.

The vehicle's coolant circuit is thermally coupled to the refrigerant circuit via the chillers and usually contains a water-glycol mixture which, depending on the operating status of the entire system, functions as a coolant or also as a heat carrier.

The coolant cooler is a radiator that gives off heat to the ambient air. The battery heat exchanger absorbs waste heat from the battery in the coolant circuit and dissipates it in order to enable optimal operation of the battery. The drive train cooler also absorbs heat from the components of the drive train to cool it. Components of the drive train are, for example, components that produce electronic waste heat, and the electric motor drive itself.

The thermal management system includes a fully-fledged heat pump system with which heat can be obtained from the ambient air and waste heat from the electrical drive train components.

On the refrigerant side, the heat of condensation can be given off both by the water-cooled heating condenser into the A/C-coolant circuit and by the external heat exchanger into the ambient air. The use of a 3/2-way refrigerant valve with an expansion function between the heating condenser, which is also referred to as a water-cooled condenser, and the external heat exchanger allows the water-cooled condenser on the refrigerant side either to be bypassed with a bypass or to change or expand the pressure level between the water-cooled condenser and the external heat exchanger. By setting this so-called intermediate pressure level, the external heat exchanger can either be used as a condenser for giving off heat into the environment or as an evaporator for absorbing heat from the ambient air.

The battery temperature control loop and the electric drive cooling loop serve to absorb the waste heat of the HV battery and the electric drive components. These two coolant circuits can either be merged or completely separated from one another, depending on whether the heat is to be given off to the ambient air or recovered.

The system uses a battery chiller, with which the battery can be cooled actively, and a drive train chiller that serves to absorb the waste heat from the electric and electronic drive components and to provide it to the refrigerant circuit as heat of evaporation. In the combined heat pump mode, which corresponds to the combined use of the ambient air as well as the waste heat of the electric drive train components as a heat source, the refrigerant mass flow between the external heat exchanger and the drive train chiller is divided into two parallel flows. A parallel flow through the two components results in a reduction of the pressure loss on the suction side of the refrigerant circuit. In the pure water heat pump operation, downstream of the water-cooled condenser, the refrigerant is directed past the external heat exchanger and directly to the drive train chiller. In this way, the waste heat from the electric and electronic drive components can be absorbed at a higher temperature level, which can be well above the ambient temperature. This allows the system to be operated with a higher suction pressure, which at the same time leads to higher performance and efficiency.

By using a 3/2-way coolant valve at the outlet of the heating register, the coolant flow can be diverted through an indirect coolant-coolant heat exchanger. This heat exchanger serves to transfer heat from the indirect battery heating loop of the heating circuit into the secondary bypass circuit, wherein, in the operating mode of the heat transfer into the battery temperature control loop, the battery is heated. In this way, the HV-PTC of the heating device can be used to heat up the battery. In this case, however, the excess heat of condensation from the refrigerant circuit can also be fed into the battery temperature control loop via the heating circuit in order to be used there either as heat of evaporation in the battery chiller or as a heat source for heating the battery. The indirect heat exchanger is mounted in a bypass line, the secondary bypass circuit, to the battery chiller, so that in active battery cooling this component is not subjected to the main coolant volume flow, which circulates for cooling the battery between the battery chiller and the battery heat exchanger of the HV battery. In this way, the indirect heat exchanger does not cause any additional pressure loss in the battery cooling mode.

It is particularly advantageous that up to fifteen different operating modes can be set with the specified system. In this case, four different operating modes for cooling at ambient temperatures between 25° C. and 50° C. are realized as vehicle cabin cooling, active battery cooling, passive battery cooling and drive train cooling.

In the dehumidification and reheating mode at ambient temperatures of 0° C. to 25° C., five operating modes for vehicle cabin air dehumidification and vehicle cabin reheating circuit are realized.

As a third main operating mode of heating at temperatures between −18° C. and 0° C., six operating modes are realized, which can be subdivided in the groups of vehicle cabin heating and battery heating.

BRIEF DESCRIPTION OF DRAWINGS

Further details, features and advantages of configurations of the invention emerge from the following description of exemplary embodiments with reference to the associated drawings.

DESCRIPTION OF AN EMBODIMENT

Figure 1:
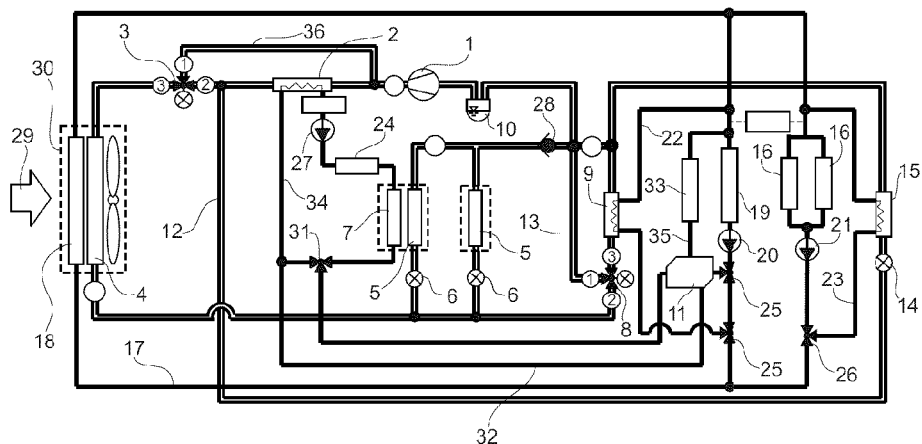
FIG. 1: shows a refrigeration system and heat pump circuit.

FIG. 1 illustrates the refrigeration system and heat pump circuit of a heat pump arrangement with indirect battery heating for battery-operated motor vehicles as a schematic diagram. The system substantially consists of a refrigerant circuit, which is thermally coupled to a coolant circuit via various indirect heat exchangers.

In its basic form, the refrigerant circuit consists of a compressor 1 and a heating condenser 2, which is also referred to as water-cooled condenser 2. Downstream thereof a 3/2-way expansion valve 3 as well as an external heat exchanger 4 are arranged on the refrigerant side. Furthermore, downstream of the external heat exchanger 4, an evaporator 5 as well as a battery chiller 9 are arranged in parallel in the refrigerant circuit, after which the refrigerant is fed back to the compressor 1 via an accumulator 10. In the illustration according to FIG. 1, two evaporators 5 are connected in parallel, which are configured, for example, as an evaporator 5 for the front area and an evaporator 5 for the rear area of the air conditioning system of a vehicle. Associated expansion element 6 is assigned to each of evaporators 5, wherein a 3/2-way expansion valve 8 is assigned to battery chiller 9. The 3/2-way expansion valve 8 has an outlet to the bypass 13, which is connected to bypass battery chiller 9 and to route the refrigerant directly to the refrigerant collector 10.

The refrigerant circuit further has a heating condenser bypass 36, which immediately downstream of the compressor 1 bypasses water-cooled condenser 2 in parallel and is re-integrated into the refrigerant circuit in 3/2-way expansion valve 3.

Furthermore, the refrigerant circuit has a bypass 12, which branches off downstream of heating condenser 2 and directs refrigerant to associated drive train chiller 15 via expansion element 14, after which the refrigerant is fed to the compressor 1 via refrigerant collector 10, which is also referred to as an accumulator.

The refrigerant circuit is thermally coupled to an A/C coolant circuit as well as a battery coolant circuit and an e-drive train circuit. The A/C coolant circuit consists of a heating circuit 34 which, on the coolant side, is routed from the heating condenser 2 to the thermal heat exchanger 7 via a coolant pump 27 and a heating device 24. Furthermore, the heating circuit 34 contains an indirect battery heating loop 32, which is routed downstream of the thermal heat exchanger 7 to indirect heat exchanger 11 via a 3/2-way valve 31 and is configured as a loop of the heating circuit. The battery cooling loop and the e-drive train cooling loop are parts of coolant circuit 17, which initially consists of the coolant cooler 18, in which ambient air 29 absorbs or gives off heat.

Coolant cooler 18 is, together with external heat exchanger 4, accommodated in cooler unit 30 of a motor vehicle. Coolant circuit 17 branches off in parallel with the cooling of battery heat exchanger 19 as well as with the cooling of drive train cooler 16. Battery temperature control loop 22 contains battery heat exchanger 19 and has two 3/2-way valves 25 as well as battery chiller 9. This coolant loop is driven by coolant pump 20.

Furthermore, a secondary bypass circuit 35 is provided in the battery cooling loop which secondary bypass circuit is decoupled via a 3/2-way valve 25 and runs via indirect heat exchanger 11 and battery electronics cooler 33 as well as battery heat exchanger 19.

Indirect heat exchanger 11 thermally couples indirect battery heating loop 32 with secondary bypass circuit 35. Via indirect heat exchanger 11, heat of heating circuit 34 is transferred from heating condenser 2 to secondary bypass circuit 35 via indirect battery heating loop 32, which secondary bypass circuit finally gives off the heat to battery heat exchanger 19.

On the coolant side, drive train coolers 16 are integrated into electric drive cooling loop 23, which can be actively cooled via drive train chiller 15. According to FIG. 1, two drive train coolers 16 are provided for the front and rear areas, wherein a coolant pump 21 conveys the coolant. Electric drive cooling loop 23 branches off from coolant circuit 17 downstream of coolant pump 21 via 3/2-way valve 26.

With the refrigeration system and heat pump circuit shown in FIG. 1, various methods of thermal management of a modern battery-electric vehicle can be operated. In FIGS. 2 to 16 below, different variants of the methods of cooling or heating supply are illustrated and explained.

Figure 2:
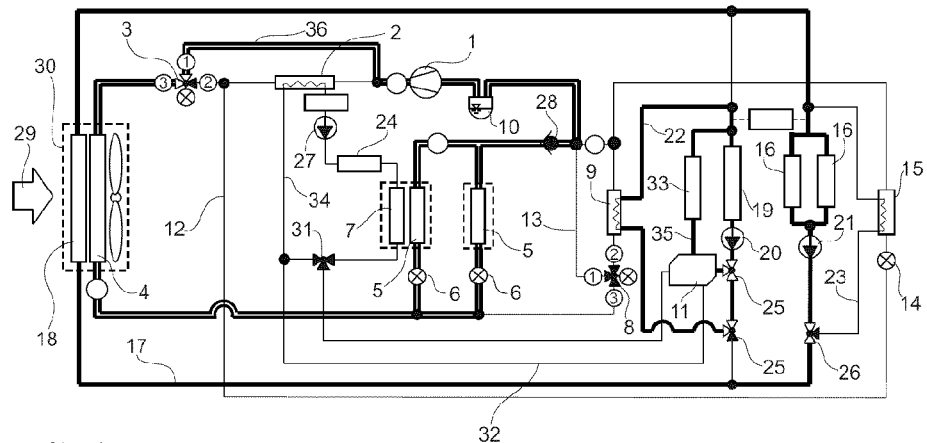
FIG. 2: shows vehicle cabin cooling.

The mode of vehicle cabin cooling is shown in FIG. 2. For this purpose, compressor 1 is operated and the refrigerant is compressed, which then reaches external heat exchanger 4 via heating condenser bypass 36 and 3/2-way expansion valve 3, where it condenses releasing heat and then expands in expansion elements 6 and evaporates in associated evaporators 5 with heat absorption from the vehicle cabin air. After passing through check valve 28 to refrigerant collector 10 and to compressor 1, the circuit closes.

By way of example, FIG. 2 illustrates two evaporators 5 which are connected in parallel, one of which is the front evaporator and one of which is the rear evaporator of a modern multi-zone air conditioning system. After the coolant has absorbed heat in drive train coolers 16, coolant circuit 17 is routed to coolant cooler 18 via coolant pump 21 which coolant cooler 18, as a radiator, gives off the heat to ambient air 29. The cooled coolant then reaches drive train coolers 16; the circuit is closed. Independently of coolant circuit 17, a battery cooling loop 22 is implemented with battery heat exchanger 19, coolant pump 20 as well as, in parallel, indirect heat exchanger 11 and battery electronics cooler 33. In parallel, the coolant flows via battery chiller 9 that is not operated on the refrigerant side, and together with the sub-branch from indirect heat exchanger 11 via battery heat exchanger 19. Battery cooling loop 22 is coupled in parallel with secondary bypass circuit 35, and they can be operated independently of coolant circuit 17.

In this mode, in summary, the air flowing into the cabin is cooled by two evaporators 5 arranged in parallel for the front and rear areas in the air conditioning system of the vehicle.

In this case, the refrigerant is directed around water-cooled condenser 2. The connection 1 to 3 of 3/2-way expansion valve 3 between water-cooled condenser 2 and external heat exchanger 4 is fully opened so that the refrigerant flows from compressor 1 into external heat exchanger 4 without any appreciable pressure loss. In external heat exchanger 4, the heat of condensation of the refrigerant is given off to ambient air 29.

The refrigerant is expanded into evaporators 5 arranged in parallel in order to cool the air flowing into the cabin.

Figure 3:
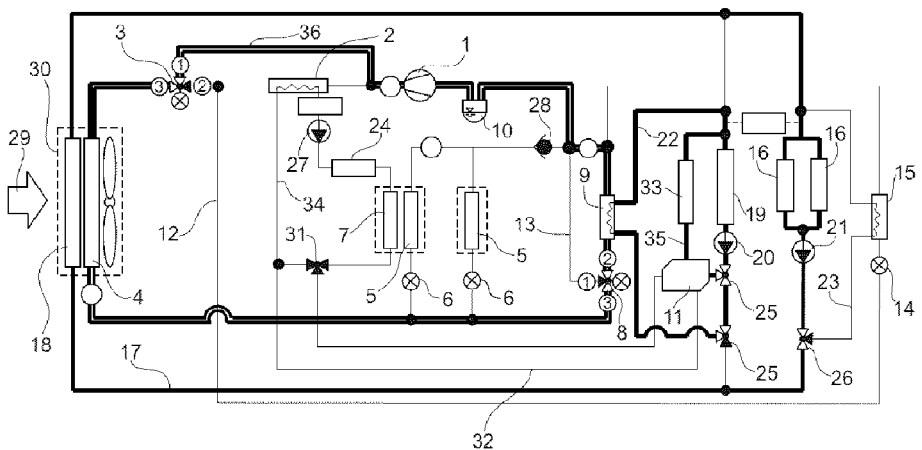
FIG. 3: shows active battery cooling.

FIG. 3 illustrates the active battery cooling. In contrast to FIG. 2, there is no flow through evaporators 5 and instead battery chiller 9 with associated 3/2-way expansion valve 8 is supplied with liquid refrigerant for evaporation. The refrigerant vapor is then routed to compressor 1 via refrigerant collector 10. The cold provided in battery chiller 9 is transported to battery heat exchanger 19 via battery cooling loop 22 and which battery heat exchanger is thus cooled. In parallel, battery electronics cooler 33 is also supplied with cold. Drive train coolers 16 are operated in coolant circuit 17, coolant pump 21 conveys the coolant for indirect cooling via coolant cooler 18, wherein ambient air 29 absorbs the heat of the drive train components.

In this mode, in summary, the HV battery is actively cooled by giving off heat to the refrigerant. In this case, the refrigerant is directed around water-cooled condenser 2 in heating condenser bypass 36. The connection 1 to 3 of 3/2-way expansion valve 3 between water-cooled condenser 2 and external heat exchanger 4 is fully opened so that the refrigerant flows from compressor 1 into external heat exchanger 4 without any appreciable pressure loss. In external heat exchanger 4, the heat of condensation of the refrigerant is given off to ambient air 29. The refrigerant is expanded into battery chiller 9 in order to cool the coolant flowing through the chiller.

The battery electronics integrated around the HV battery in secondary bypass circuit 35 is also cooled by the coolant exiting from battery heat exchanger 19. The flow through secondary bypass circuit 35 is regulated by first 3/2-way valve 25 downstream of battery heat exchanger 19 so that the main volume flow flows through battery chiller 9 and an auxiliary volume flow flows through battery electronics cooler 33.

Figure 4:
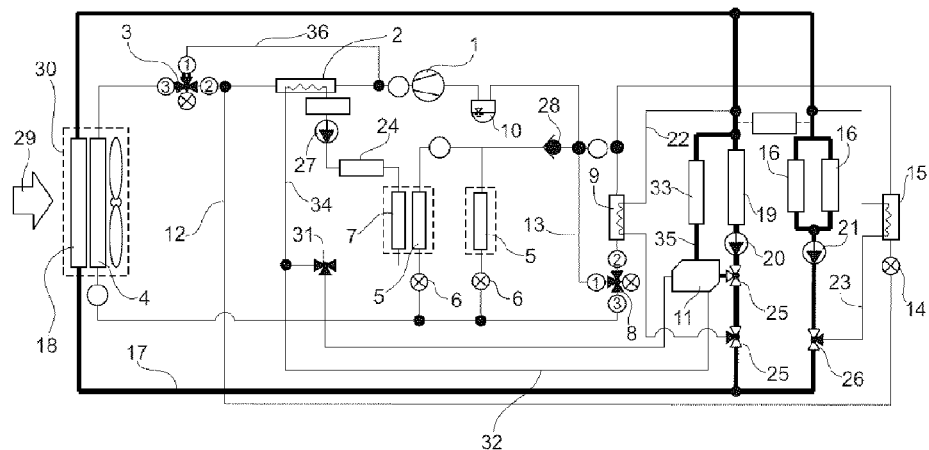
FIG. 4: shows passive battery cooling.

FIG. 4 illustrates the passive battery cooling. In this case, coolant circuit 17 is operated with coolant cooler 18 and the coolant is routed in parallel via battery heat exchanger 19 as well as battery electronics cooler 33 as well as via drive train cooler 16. According to FIG. 4, the parallel branches are operated by coolant pumps 20 and 21.

In this mode, the HV battery is passively cooled by giving off heat to ambient air 29. In this case, the waste heat of the HV battery, together with the waste heat of the electric drive train is given off to ambient air 29 via coolant cooler 18, which is to be classified as a low-temperature cooler according to its temperature level.

The battery electronics integrated around the HV battery in secondary bypass circuit 35 is cooled by the coolant exiting from battery heat exchanger 19. The flow through secondary bypass circuit 35 is regulated by first 3/2-way valve 25 downstream of battery heat exchanger 19 so that the main volume flow flows through battery heat exchanger 19 and an auxiliary volume flow flows through battery electronics cooler 33.

Figure 5:
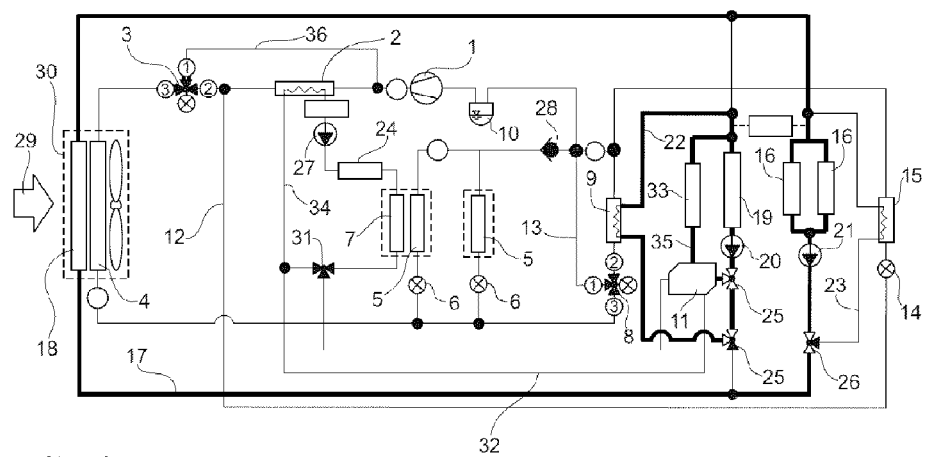
FIG. 5: shows drive train cooling.

FIG. 5 shows the drive train cooling, wherein, in contrast to FIG. 4, battery heat exchanger 19 is operated independently of coolant circuit 17 via battery cooling loop 22 and secondary bypass circuit 35. Only drive train coolers 16 are integrated in coolant circuit 17 and are passively cooled by ambient air 29 by giving off heat in coolant cooler 18.

In this mode, in summary, the electric drive train is cooled by the coolant circulating between the electric and electronic drive components and coolant cooler 18. In doing so, the waste heat is absorbed by the coolant and given off to ambient air 29.

Figure 6:
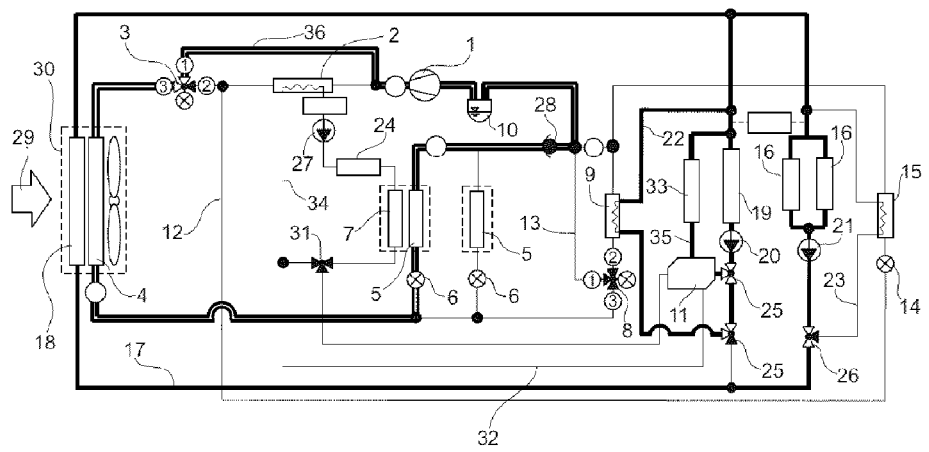
FIG. 6: shows vehicle cabin dehumidification.

FIG. 6 illustrates the vehicle cabin dehumidification. For this purpose, the re-frigerant circuit is operated to dehumidify the vehicle cabin air. For this purpose, compressor 1 compresses the refrigerant, which is then routed to external heat exchanger 4 via heating condenser bypass 36 and 3/2-way expansion valve 3 where it gives off heat to ambient air 29. The condensed refrigerant is finally expanded in expansion element 6 of evaporator 5 and then evaporated in evaporator 5. The humidity of the vehicle cabin air condenses on the evaporator and is thus removed from the air. The refrigerant gas reaches evaporator 1 again via refrigerant collector 10. Coolant circuit 17 as well as battery cooling loop 22 and secondary bypass circuit 35 are active in this mode, as described in FIG. 5.

Figure 7:
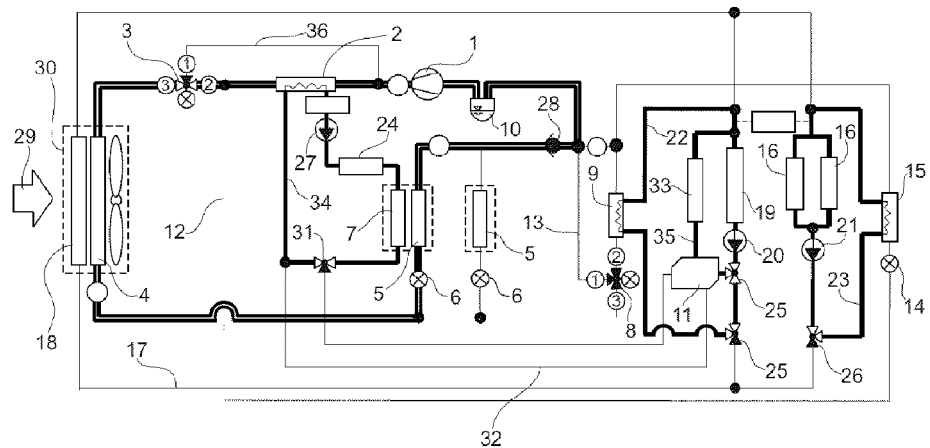
FIG. 7: shows vehicle cabin reheating.

FIG. 7 illustrates the reheating mode for the vehicle cabin. In the reheating mode, both heat and cold are provided for the vehicle cabin and the air for the vehicle cabin is first dehumidified and then heated to the desired temperature. For this purpose, the refrigerant in compressor 1 is directed over heating condenser 2, where it gives off heat to heating circuit 34, which directs the coolant, which acts as a heat carrier in this mode, via thermal heat exchanger 7, where the heat is given off to the air for the vehicle cabin. Downstream of heating condenser 2, the refrigerant reaches external heat exchanger 4 and after expansion in expansion element 6, it reaches evaporator 5, in which the heat for dehumidifying the air is absorbed. Battery cooling loop 22 and secondary bypass circuit 35 are operated for battery heat exchanger 19, and electric drive cooling loop 23 is operated independently thereof with drive train coolers 16.

In this mode, in summary, the air flowing into the cabin is first dehumidified and then heated to a desired temperature. The air is dehumidified as it flows through evaporator 5. Downstream of evaporator 5, the air is heated while it flows through thermal heat exchanger 7.

In this case, the refrigerant flows through water-cooled condenser 2 on the high pressure side. The connection 2 to 3 of 3/2-way expansion valve 3 between the heating condenser 2 and the external heat exchanger 5 is regulated in order to set the heat into the coolant circuit required in the case of reheating or to give off the excess heat of condensation of the refrigerant to ambient air 29. This can be done, for example, by setting the pressure level in external heat exchanger 4. Depending on the ambient temperature and the respective heating or cooling capacity required, external heat exchanger 4 can be operated either as a condenser for giving off heat of condensation to the environment or as an evaporator for absorbing heat of evaporation from ambient air 29.

Figure 8:
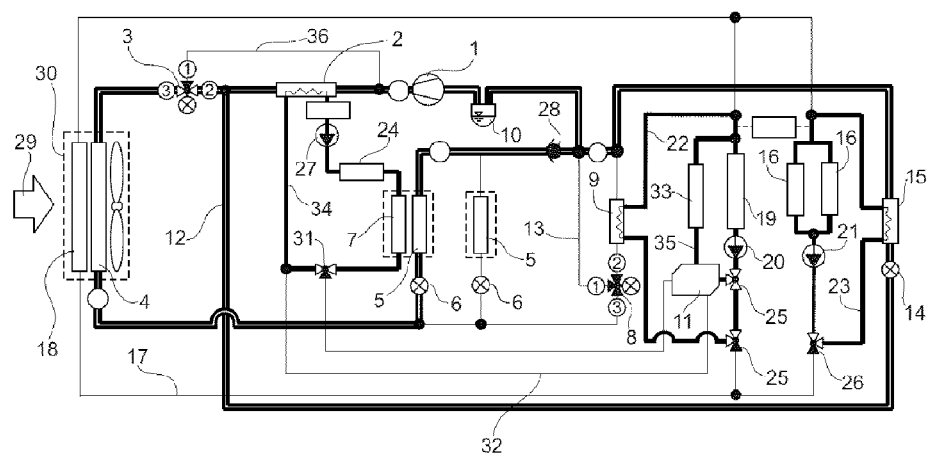
FIG. 8: shows vehicle cabin reheating with drive train waste heat.

In FIG. 8, the reheating operation for the vehicle cabin is operated in an extended mode, according to which the refrigeration system circuit is expanded with a partial flow to drive train chiller 15 with associated expansion element 14 via bypass 12. In doing so, drive train chiller 15 is actively cooled and the coolant of electric drive cooling loop 23 cools drive train coolers 16.

In addition to the operating mode described above in FIG. 7, expansion element 14 can be opened at the inlet of drive train chiller 15 to additionally absorb the waste heat of the electric drive components in the absence of heat of evaporation. In this case, the refrigerant flow is divided in parallel between external heat exchanger 4 and drive train chiller 15 after the heat is given off in water-cooled condenser 2.

Figure 9:
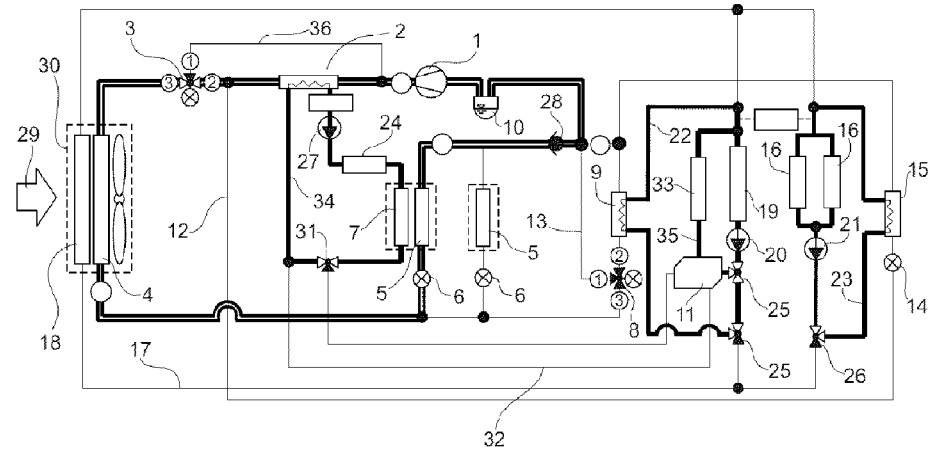
FIG. 9: shows vehicle cabin reheating with heating device or refrigeration system waste heat.

FIG. 9 shows the reheating circuit according to FIG. 7, wherein a coolant heating is additionally used as a heating device 24 in heating circuit 34 in order to heat the coolant additionally to a desired target temperature.

In this mode, the air flowing into the cabin is first dehumidified and then heated to a desired temperature. The air is dehumidified as it flows through the evaporator 5. Downstream of the evaporator 5, the air is heated while it flows through thermal heat exchanger 7.

In this case, the refrigerant flows via water-cooled condenser 2 on the high pressure side. The connection 2 to 3 of 3/2-way expansion valve 3 between heating condenser 2 and external heat exchanger 4 is regulated. In this case, the intermediate pressure level in external heat exchanger 4 is set so that the temperature of the refrigerant in external heat exchanger 4 corresponds to the ambient temperature. Due to the lack of a difference in temperature, there is no heat transfer between the refrigerant and ambient air 29. In this way, neither heat is given off to ambient air 29 nor is heat removed from it.

Figure 10:
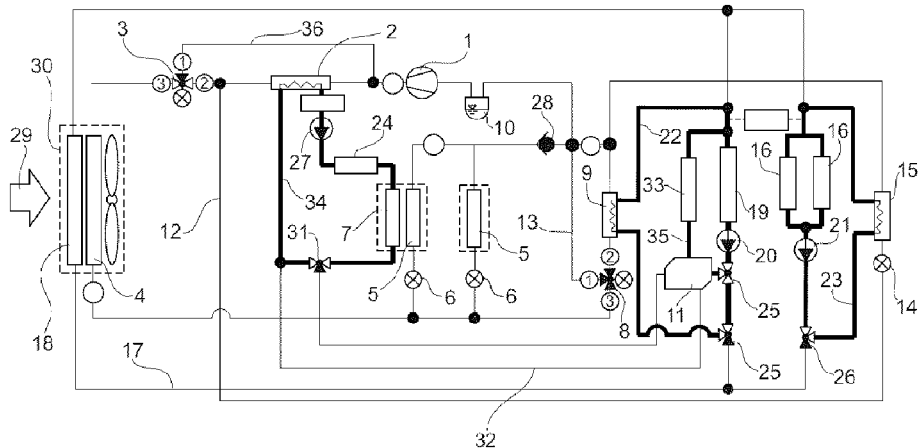
FIG. 10: shows vehicle cabin heating with heating device.

FIG. 10 shows a circuit for vehicle cabin heating. In this case, the vehicle cabin is heated purely electrically.

In this mode, the air flowing into the cabin is heated via thermal heat exchanger 7 in that the coolant flowing through thermal heat exchanger 7 is directly heated by heating device 24. In this way, the heating capacity required to heat up the cabin is provided purely electrically by heating device 24.

By means of heating device 24, the heating circuit 34 is operated with coolant pump 27 and thermal heat exchanger 7 for heating the vehicle cabin air. Battery heat exchanger 19 and drive train coolers 16 are operated in parallel in their coolant loops independently of one another, without external heat exchanger 4 being active.

Figure 11:
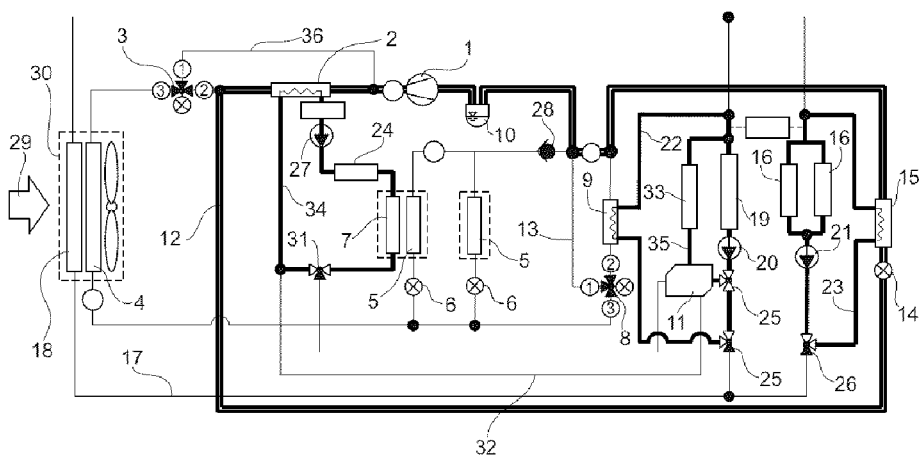
FIG. 11: shows vehicle cabin heating with drive train waste heat.

FIG. 11 shows a method for vehicle cabin heating, using the waste heat of the drive train components. In this case, compressor 1 and heating condenser 2 are connected to expansion element 14 and to drive train chiller 15 to refrigerant collector 10 via bypass 12. The heat of condensation is given off to heating circuit 34 in heating condenser 2 and heating circuit 34 gives it off to the vehicle cabin air in thermal heat exchanger 7. Battery heat exchanger 19 and drive train coolers 16 are, as in the mode according to FIGS. 11, 10, 9 and 7, operated in parallel and independently of one another.

In this mode, in summary, the air flowing into the cabin is heated via thermal heat exchanger 7 in that the heat of condensation of the refrigerant is given off to the coolant flowing through thermal heat exchanger 7.

After the heat has been given off in water-cooled condenser 2, the refrigerant flows back to compressor 1 via drive train chiller 15. In this way, the waste heat of the electric drive train is used as a heat source for the heat pump system. Thus, a water-heat pump functionality is used.

Figure 12:
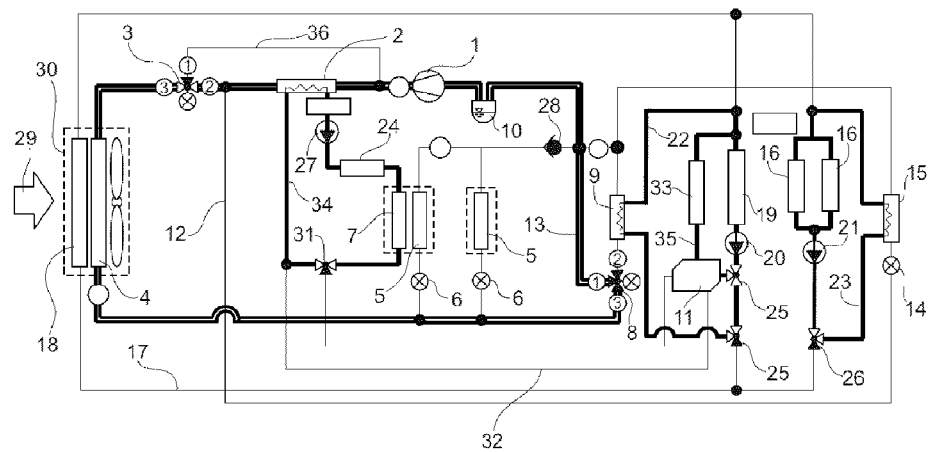
FIG. 12: shows vehicle cabin heating.

FIG. 12 illustrates the vehicle cabin heating with no active battery cooling taking place with the refrigerant circuit. The refrigerant is compressed in compressor 1, at least partially condensed in heating condenser 2, and then routed to external heat exchanger 4 via 3/2-way expansion valve 3. Downstream of heating condenser 2, the refrigerant is expanded in 3/2-way expansion valve 3 and absorbs heat from ambient air 29 in external heat exchanger 4 and then reaches refrigerant collector 10 and finally compressor 1 via 3/2-way expansion valve 8 in bypass position via bypass 13. Here, too, battery heat exchanger 19 and drive train coolers 16 are recirculated separately.

In this mode, in summary, the air flowing into the cabin is heated via thermal heat exchanger 7 in that the heat of condensation of the refrigerant is given off to the coolant flowing through thermal heat exchanger 7.

After the heat has been given off in water-cooled condenser 2, the refrigerant continues to flow through 3/2-way expansion valve 3. The connection 2 to 3 of 3/2-way expansion valve 3 between water-cooled condenser 2 and external heat exchanger 4 is regulated so that in external heat exchanger 4 the evaporation capacity of the refrigerant required for the heat pump operation can be absorbed from ambient air 29. The refrigerant continues to flow to battery chiller 9 back to compressor 1 via bypass 13. Thus, an air heat pump functionality is used.

In the combined heat pump operation, the modes according to FIG. 11 and FIG. 12 are executed simultaneously.

Figure 13:
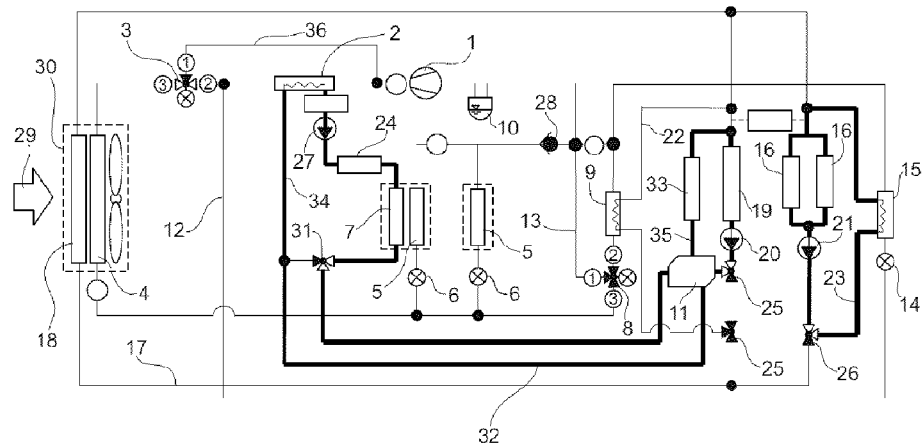
FIG. 13: shows battery heating with heating device.

FIG. 13 illustrates the battery heating by means of heating device 24. Heating device 24 within heating circuit 34 heats the coolant, which in this case functions as a heat carrier, and via 3/2-way valve 31 the heat carrier reaches indirect heat exchanger 11 via indirect battery heating loop 32, where the heat is given off to secondary bypass circuit 35 and finally to battery heat exchanger 19. Secondary bypass circuit 35 is recirculated and cooled with battery heat exchanger 19 via coolant pump 20 and first 3/2-way valve 25 to indirect heat exchanger 11 and battery electronics cooler 33.

Electric drive cooling loop 23 is operated independently thereof in this operating mode.

In this mode, in summary, 3/2-way valve 31 at the outlet of thermal heat exchanger 7 is connected so that the coolant can flow through indirect heat exchanger 11. According to its function, indirect heat exchanger 11 is a coolant-coolant heat exchanger, which transfers heat from indirect battery heating loop 32 to secondary bypass circuit 35. Before that, the coolant flowing through indirect heat exchanger 11 is heated to a desired temperature by means of heating device 24.

In indirect heat exchanger 11, the heat required for heating the battery is transferred from the A/C coolant circuit to the battery coolant circuit. In the battery coolant circuit, the coolant flows exclusively through the integrated electronics and battery heat exchanger 19 via smaller secondary bypass circuit 35.

Figure 14:
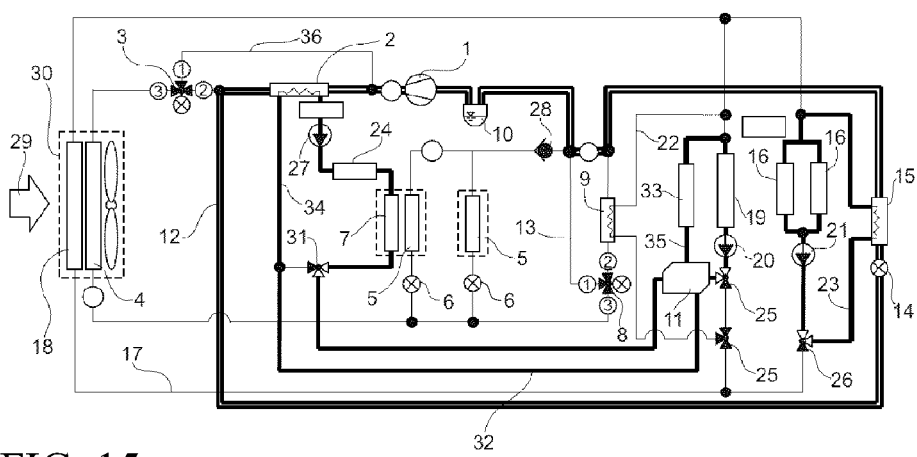
FIG. 14: shows battery heating with drive train waste heat.

In FIG. 14, battery heating is again connected via heating circuit 34 and indirect battery heating loop 32, wherein the refrigerant circuit is operated instead of heating device 24 and the heat of condensation is fed into heating circuit 34 via heating condenser 2. The refrigerant is compressed in compressor 1, condensed in heating condenser 2 and routed to expansion element 14 of drive train chiller 15 via bypass 12. Drive train chiller 15 absorbs the waste heat of drive train cooler 16 and makes it available to battery heat exchanger 19 via refrigerant collector 10 and compressor 1 and then via heating condenser 2, as described above.

In this mode, in summary, 3/2-way valve 31 at the outlet of thermal heat exchanger 7 is connected so that the coolant can flow through indirect coolant-coolant heat exchanger 11. Before that, the coolant flowing through indirect coolant-coolant heat exchanger 11 is heated to a desired temperature by means of the heat of condensation of the refrigerant.

After the heat has been given off in water-cooled condenser 2, the refrigerant flows back to compressor 1 via drive train chiller 15. In this way, the waste heat of the electric drive train is used as a heat source for the heat pump system. Thus, a water-heat pump functionality is used.

Figure 15:
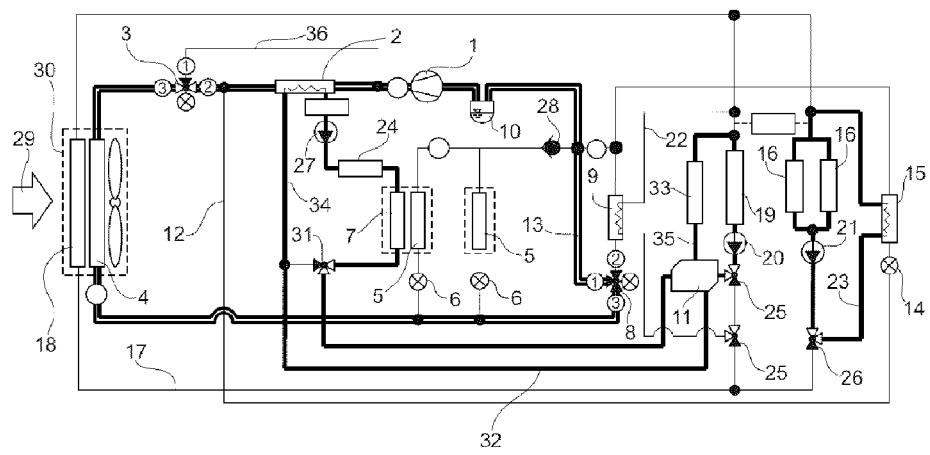
FIG. 15: shows battery heating with ambient heat.

Finally, FIG. 15 illustrates a battery heating with additional use of the ambient heat of ambient air 29. The refrigerant is compressed in compressor 1, condensed in heating condenser 2 and then expanded in 3/2-way expansion valve 3. In external heat exchanger 4, the refrigerant absorbs heat of ambient air 29 with evaporation. The evaporated refrigerant reaches refrigerant collector 10 and compressor 1 via 3/2-way expansion valve 8 and its bypass outlet via bypass 13. Secondary bypass circuit 35 with battery heat exchanger 19 is supplied with heat via indirect heat exchanger 11. Said heat was fed into heating circuit 34 via heating condenser 2 and reaches indirect heat exchanger 11 via indirect battery heating loop 32. Independently thereof, drive train coolers 16 are recirculated in electric drive cooling loop 23.

In this mode, in summary, the 3/2-way valve at the outlet of thermal heat exchanger 7 is connected so that the coolant can flow through the indirect coolant-coolant heat exchanger 11. Before that, the coolant flowing through indirect coolant-coolant heat exchanger 11 is heated to a desired temperature by means of the heat of condensation of the refrigerant.

After the heat has been given off in water-cooled condenser 2, the refrigerant continues to flow through 3/2-way expansion valve 3. The connection 2 to 3 of 3/2-way expansion valve 3 between water-cooled condenser 2 and external heat exchanger 4 is regulated so that in external heat exchanger 4 the evaporation capacity of the refrigerant required for the heat pump operation can be absorbed from ambient air. The refrigerant continues to flow to battery chiller 9 back to compressor 1 via bypass 13. Thus, an air heat pump functionality is used.

Figure 16:
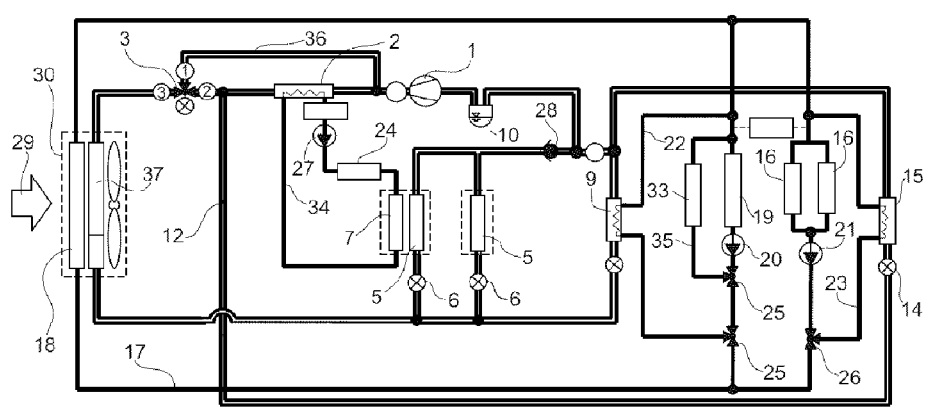
FIG. 16: shows a refrigeration system circuit with increased cooling capacity.

The refrigeration system circuit according to FIG. 16 is a simplified version of the re-frigeration system and heat pump circuit according to FIG. 1, which is designed mainly for the provision of higher cooling capacities at high ambient temperatures. Instead of an external heat exchanger in the circuit according to FIG. 1, an A/C condenser 37 with an active sub-cooling section and a collector are provided. A/C condenser 37 is designed as a heat exchanger for giving off heat of condensation to ambient air 29 and achieves a higher output than an external heat exchanger under the same boundary conditions. At the same time, the functionality of the air heat pump-absorbing heat from the ambient air-no longer exists in the case of A/C condenser 37. In the heating operation, the refrigeration system circuit, therefore, can only fall back on the waste heat of the electric and electronic drive components from coolant circuit 17 as the heat of evaporation for the refrigerant. Due to lack of the air heat pump functionality the refrigerant bypass around the battery chiller is also no longer needed.

Due to the reduced functionality, the refrigeration system circuit is less complex and, compared to the refrigeration system and heat pump circuit according to FIG. 1, also requires fewer components.

The invention relates to a heat pump arrangement with indirect battery heating for battery-operated motor vehicles.

The invention also relates to a method of operating a heat pump arrangement in selected operating modes.

The field of application of the invention is in the field of electrically powered vehicles which, as a rule, use high-voltage batteries (HV batteries) as energy storage devices for supplying energy to the vehicle's drive train.

The invention claimed is:

1. A heat pump arrangement with indirect battery heating for battery-operated vehicles, comprising:
    a refrigerant circuit with a compressor, a heating condenser, a first 3/2-way expansion valve, an external heat exchanger, at least one evaporator with a first expansion element as well as a second 3/2-way expansion valve arranged in parallel to the evaporator, and a battery chiller, wherein
    a bypass with a second expansion element and a drive train chiller is arranged between the heating condenser and the first 3/2-way expansion valve, and
    a coolant circuit with a coolant cooler and a battery heat exchanger with a first coolant pump and at least one drive train cooler with a second coolant pump arranged in parallel to the battery heat exchanger, wherein
    a battery temperature control loop with the battery heat exchanger, the first coolant pump, a first 3/2-way valve and the battery chiller on the coolant side and
    an electric drive cooling loop with the drive train cooler, the second coolant pump, a second 3/2-way valve and the drive train chiller on the coolant side are formed in such a way that the battery temperature control loop and the electric drive cooling loop can be operated independently of one another and independently of the coolant circuit as separate circuits, and
    a heating circuit with the heating condenser, a third coolant pump, a heating device, a thermal heat exchanger as well as an indirect battery heating loop with an indirect heat exchanger, which battery heating loop can be connected via a third 3/2-way valve, and
    a secondary bypass circuit as part of the coolant circuit with the battery heat exchanger, the first coolant pump, the first 3/2-way valve, and the indirect heat exchanger.

2. The heat pump arrangement according to claim 1, wherein the first 3/2-way expansion valve and the second 3/2-way expansion valve are formed with an expansion function and a bypass function.

3. The heat pump arrangement according to claim 1, wherein a heating condenser bypass is arranged in the refrigerant circuit as a connection between a high pressure outlet of the compressor and the first 3/2-way expansion valve.

4. The heat pump arrangement according to claim 1, wherein a refrigerant collector is arranged upstream of the compressor in the refrigerant circuit.

5. The heat pump arrangement according to claim 1, wherein a battery electronics cooler is arranged in the secondary bypass circuit.

6. The heat pump arrangement according to claim 1, wherein the external heat exchanger and the coolant cooler are formed together in a cooler unit, wherein the external heat exchanger is arranged downstream of the coolant cooler in the direction of flow of ambient air.

7. The heat pump arrangement according to claim 1, wherein a bypass is arranged in parallel to the battery chiller in the refrigerant circuit.

8. A method of operating the heat pump arrangement according to claim 3 for actively cooling a vehicle cabin, wherein a refrigerant downstream of the compressor flows to the external heat exchanger operating as a condenser via the heating condenser bypass and the 3/2-way first expansion valve and subsequently expands in the first expansion element and is evaporated in the evaporator, wherein the battery heat exchanger has coolant flowing through it and, at the same time, the battery temperature control loop and the secondary bypass circuit are operated in parallel and the coolant circuit is operated with the coolant cooler and the drive train cooler for passively cooling a drive train.

9. A method of operating the heat pump arrangement according to claim 3 for actively cooling a vehicle battery, wherein a refrigerant downstream of the compressor flows to the external heat exchanger operating as a condenser via the heating condenser bypass and the first 3/2-way expansion valve and subsequently expands in the second 3/2-way expansion valve and is evaporated in the battery chiller, wherein the battery temperature control loop is connected to the battery chiller, the battery heat exchanger and in parallel to a battery electronics cooler in the secondary bypass circuit, and the coolant circuit is operated with the coolant cooler and the drive train cooler for passively cooling a drive train.

10. A method of operating the heat pump arrangement according to claim 5 for passively cooling a vehicle battery, wherein the coolant circuit is operated with the coolant cooler and the battery heat exchanger as well as, in parallel, the drive train cooler for passive cooling, wherein the secondary bypass circuit with the battery electronics cooler is operated in parallel.

11. A method of operating the heat pump arrangement according to claim 5 for passively cooling a drive train, wherein the coolant circuit with the coolant cooler and the drive train cooler is operated for passive cooling, wherein the battery temperature control loop with the battery heat exchanger and the secondary bypass circuit with the battery electronics cooler are operated in parallel to one another and independently of the coolant circuit.

12. A method of operating the heat pump arrangement according to claim 1 for reheating a vehicle cabin, wherein a refrigerant downstream of the compressor flows to the external heat exchanger operating as a condenser or as an evaporator via the heating condenser and the first 3/2-way expansion valve and subsequently expands in the first expansion element and is evaporated in the evaporator, wherein the battery heat exchanger has coolant flowing through it and, at the same time, the battery temperature control loop and the secondary bypass circuit are operated in parallel and the electric drive cooling loop is operated with the drive train cooler, and the heating circuit is operated with the heating condenser and the thermal heat exchanger.

13. The method of operating the heat pump arrangement according to claim 12 for reheating the vehicle cabin, wherein a heating device is also operated in the heating circuit.

14. The method of operating the heat pump arrangement according to claim 12 for reheating the vehicle cabin, wherein a partial flow of the refrigerant downstream of the heating condenser flows via the bypass and expands in the second expansion element and is evaporated in the drive train chiller in order to absorb additionally waste heat of drive train components.

15. The method of operating the heat pump arrangement according to claim 12 for reheating the vehicle cabin, wherein an intermediate pressure level in the external heat exchanger is set in such a way that a temperature of the refrigerant in the external heat exchanger corresponds to a temperature of ambient air.

16. A method of operating the heat pump arrangement according to claim 1 for heating a vehicle cabin with waste heat of a drive train, wherein a refrigerant downstream of the compressor flows via the heating condenser and the bypass and subsequently expands in the second expansion element and is evaporated in the drive train chiller, wherein the battery heat exchanger has coolant flowing through it and, at the same time, the battery temperature control loop and the secondary bypass circuit are operated in parallel and the electric drive cooling loop is operated with the drive train cooler, as well as the heating circuit is operated with the heating condenser and the thermal heat exchanger.

17. A method of operating the heat pump arrangement according to claim 1 for heating a vehicle cabin with ambient heat, wherein a refrigerant downstream of the compressor flows to the first 3/2-way expansion valve via the heating condenser and expands and is evaporated in the external heat exchanger, wherein the battery heat exchanger has coolant flowing through it and, at the same time, the battery temperature control loop and the secondary bypass circuit are operated in parallel and the electric drive cooling loop is operated with the drive train cooler, as well as the heating circuit is operated with the heating condenser and the thermal heat exchanger.

18. A method of operating the heat pump arrangement according to claim 1 for indirectly heating a battery, wherein the heating circuit is heated with the heating device to the desired temperature and is connected to the indirect heat exchanger via the third 3/2-way valve, wherein the heating condenser and the thermal heat exchanger are inoperative and the secondary bypass circuit is connected to the battery heat exchanger and the indirect heat exchanger, and the electric drive cooling loop is operated with the drive train cooler.

19. The method of operating the heat pump arrangement according to claim 18 for indirectly heating the battery with waste heat of a drive train, wherein a refrigerant downstream of the compressor flows via the heating condenser and the bypass and subsequently expands in the second expansion element and is evaporated in the drive train chiller, wherein the heating device is not operated.

20. The method of operating the heat pump arrangement according to claim 18 for indirectly heating the battery with ambient heat, wherein a refrigerant downstream of the compressor flows to the first 3/2-way expansion valve via the heating condenser and expands and is evaporated in the external heat exchanger and subsequently flows to the compressor via the second 3/2-way expansion valve, wherein the heating device is not operated.

* * * * *